Figure 1:
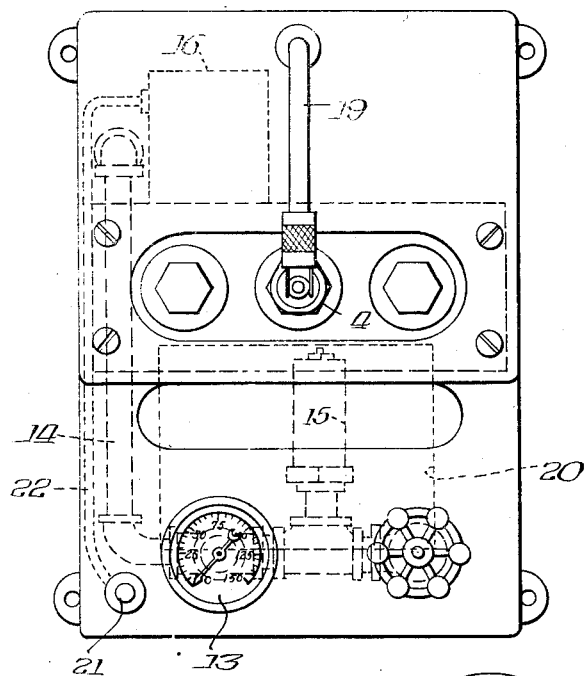

Dec. 15, 1931.  C. W. PRICE  1,836,391

SPARK PLUG TESTER

Filed June 27, 1928

Inventor
Charles W. Price
By Ira J. Wilson
Atty.

Patented Dec. 15, 1931

1,836,391

UNITED STATES PATENT OFFICE

CHARLES W. PRICE, OF ROCKFORD, ILLINOIS, ASSIGNOR TO THE P.-H. ENGINEERING COMPANY, OF ROCKFORD, ILLINOIS, A CORPORATION OF ILLINOIS

SPARK PLUG TESTER

Application filed June 27, 1928. Serial No. 288,583.

This invention relates to a device for testing spark plugs under compression so that the pressure conditions under which the plugs normally operate may be approximated and the ability of the spark plugs to function under those conditions may be observed.

In testing plugs in this manner the operator must be able to see the terminal end of the plug while it is in the compression chamber so that he may be able to observe whether a proper spark jumps across the terminals while they are under compression. Hitherto compression chambers have been provided with transparent walls through which the spark plugs may be observed, but these walls have been a source of danger to the operator whenever a quantity of gasoline, which has been allowed to remain in the plug, is exploded within the compression chamber when the spark jumps. In the past these transparent wall portions, usually glass, have frequently been shattered by the explosion and propelled with great force against the bodies of the operators with resultant serious injuries. In this invention this danger is eliminated by using an aperture which is not in direct line with the transparent wall and the plug, but is offset therefrom, the operator looking through the observation aperture toward a mirror which reflects an interior view of the spark plug compression chamber.

It is important in the successful operation of the device that the pressure chamber be kept dark so that the sparking characteristics may be accurately observed and it is also important that reflections of outside light on the mirror and glass covered apertures be eliminated or at least minimized so that the interior of the pressure chamber may be viewed with minimum difficulty. Furthermore, as the device to be useful must be adapted for rapid and convenient use in view of the relative values of the plugs being tested and the labor expended in testing them, this device is so designed and constructed that the pressure in the compression chamber may be readily altered and measured while the interior of the chamber is being conveniently and accurately observed.

Accordingly one of the objects of this invention is to provide a spark plug tester having a darkened compression chamber from which the light is normally excluded, yet whose interior can be readily viewed by the aid of a mirror.

Another object of this invention is to provide in a spark plug tester the means for observing the interior of a darkened compression chamber without danger of an explosion in the chamber expelling fragments of glass against the body of the operator.

Another object of this invention is to provide a spark plug tester in which the terminal end of a spark plug in a darkened compression chamber may be easily viewed while the pressure in the compression chamber is being altered and simultaneously indicated on a gauge convenient to the eyes of the observer.

Other objects, advantages, and capabilities which are inherently possessed by this invention will later become apparent.

Figure 2:
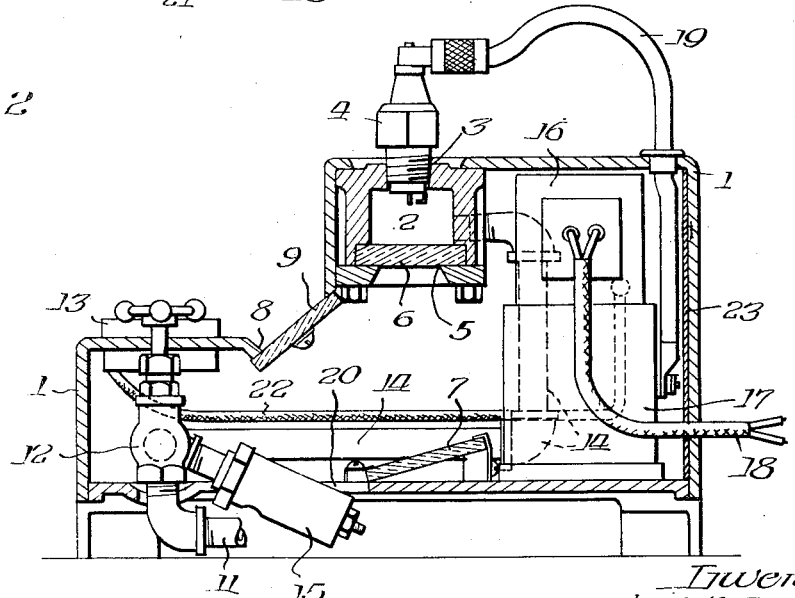

The drawings illustrate a preferred embodiment of the invention and Fig. 1 shows a plan view of the device while Figure 2 shows a vertical central sectional view of the device.

In the drawings the casing 1, contains a compression chamber 2, which may have as many openings 3 in its top wall as may be desired. In Figure 2 a spark plug 4 is shown screwed tightly into one of these openings with its terminal end extending slightly into the pressure chamber. An aperture 5 in the lower wall of the pressure chamber is covered by a transparent material, such as the piece of glass 6, which enables one to observe the interior of the pressure chamber and the terminal end of the spark plug.

A mirror 7 is suitably mounted as indicated in an inclined position so that the operator may look through the casing aperture 8, which is covered by the glass 9, and observe by reflection the interior of the pressure chamber. It is apparent that should an explosion occur in the pressure chamber and the glass 6 be shattered and expelled thereby, the fragments of this glass can neither blow out through the aperture 8 nor can they be deflected by the mirror out through the aperture 8 toward the body of the operator.

It will further be noted that the relative positions of the aperture 8 and the transparent wall 6, will prevent light from entering the pressure chamber directly through the observation aperture 8.

In order that pressure may be obtained in the compression chamber 2 a feed pipe 11, connected with any suitable source of high pressure air is connected with the valve 12 which regulates the flow of high pressure air through the indicating pressure gauge 13, thence through the pipe 14 into the compression chamber as illustrated in Fig. 2. A safety valve 15, is connected on the delivery side of the regulating valve 12 to guard against excessive pressure in the pressure chamber.

The casing 1 is also designed to house a transformer 16 and a vibrator coil 17. The feed wires 18 are connected with a suitable source of electrical supply and a lead 19 from the vibrator coil is brought up through the top of the casing where it may be readily attached to the top of the spark plug as indicated in Fig. 2.

As an additional precaution in the event of explosions the bottom of the casing has an opening 20. The safety valve extends through this opening whereby it may be reached easily for adjustment or replacement and to cause it to discharge downwardly toward the bench. Should an explosion in the pressure chamber shatter and expel the glass 6, the explosion pressure within the casing will be immediately relieved from the open bottom of the case toward the bench protecting not only the operator from injury but also anyone else who might be near. The opening 20 is placed in front of the mirror also for the purpose of enabling one to reach in and wipe from the mirror any dust or other substances which are interfering with the reflections.

The relative positions of the pressure chamber and its observation aperture, the mirror, and the glass 9 in the observation aperture in the casing will suggest that not only will light normally be excluded from the pressure chamber but minimum difficulty will be experienced with reflections of light which often occur on glass surfaces and thus interfere with vision. A device of this character will usually be mounted upon the ordinary work benches which are found in garages and repair shops. The light provided for working at these benches usually comes through a window toward which the operator at the bench faces. The direct rays of light from these windows will be shielded from the glass surface 9 by means of the higher portion of the casing in which the pressure chamber is housed. There will therefore be no reflections of light which come in a direction toward the operator. The position of the observation aperture 8 is also such that the body of the operator, when he is standing where he can look through the aperture, will normally shut off all direct rays of light which could shine against the glass and be reflected back into his eyes. The cutting off of these light reflections is very important as they interfere very considerably with the observation of weak sparks which may be jumping across the terminals of the plug or leaking down the sides of the plug.

Whenever it is desired to impress a sparking voltage across the terminals of the spark plug the button 21 will be momentarily depressed. The cable 22 connects the button 21 with the coils and the remainder of the electrical circuit. The exact method of completing this circuit is not material to the invention as any of several well known circuits may be used.

To prevent the inner bare end of the cable 19 from contacting with the casing a sheet 23 of rubber or other suitable insulation is fixed to the back wall of the casing.

Another advantage arising from the construction shown, is that only one pipe leads to the pressure chamber, the pressure relief valve being connected to that pipe outside of the pressure chamber. Since the spark plugs are always screwed very firmly into the spark plug openings and since there is only one pipe connection with the pressure chamber, there is less difficulty in maintaining pressure in the chamber than would be the case if several pipes were connected with the pressure chamber as in some of the prior art devices. Furthermore the compressed air supply connections are so arranged that the regulating valve and the gauge are disposed in a convenient place near the observation aperture to enable the valve to be regulated conveniently and the gauge to be observed while the operator is also looking through the aperture at the spark plug. He can watch the spark plug and gauge simultaneously without any unusual effort. At the same time while he is manipulating the valve to alter the pressure in the pressure chamber he is also conveniently able to press the spark button 21 to complete the electrical circuit to the spark plug.

It should be understood that the invention comprehends modifications which may differ from the disclosure considerably and yet remain within the spirit and scope of the invention.

Having shown and described the invention, I claim:

1. A spark plug tester comprising the combination of a casing and a mirror therein, a compression chamber having one wall portion thereof transparent and frangible, an opening in the opposite wall portion of the chamber for retaining a spark plug, the casing having an observation aperture, the mirror and aperture being positioned relatively to said transparent wall portion to enable one to view the interior of the chamber by looking through the aperture into the mirror and thence through said transparent wall and also positioned to exclude light from shining directly through the aperture into the chamber, the casing having a large opening for the relief of suddenly occurring internal pressures, the mirror being positioned remotely from said transparent wall portion.

2. A spark plug tester comprising the combination of a casing, a compression chamber therein, and a mirror, one wall portion of the chamber being transparent, the casing having an observation aperture and a separate pressure relief opening, the mirror and aperture being positioned relatively to said transparent wall portion to enable one to view the interior of the chamber by looking through the aperture into the mirror and thence through said transparent wall and also positioned to exclude light from shining directly through the aperture into the chamber, the mirror being positioned and said opening being provided to avoid deflecting through said aperture any particles which may be propelled into the casing by an explosion in the chamber.

3. A spark plug tester comprising the combination of a casing having an opening to the atmosphere, a pressure chamber therein having a transparent wall, means for retaining a spark plug with its terminals within the chamber in position to be viewed through said transparent wall, the casing having an observation aperture positioned relatively to the chamber to be out of the path of such flying fragments of said transparent wall as may be shattered and expelled by an explosion in the chamber, and a mirror so disposed in the casing that the terminals of the spark plug can be viewed by reflection through said aperture and said transparent wall, the mirror being positioned relatively to the aperture so that said fragments will not be deflected out through said aperture, the space between said transparent wall and the mirror being in communication with said opening.

4. A spark plug tester comprising the combination of a casing having an opening to the atmosphere, a pressure chamber therein having a transparent wall, means for retaining a spark plug with its terminals within the chamber in position to be viewed through said transparent wall, the casing having an observation aperture positioned relatively to the chamber to be out of the path of such flying fragments of said transparent wall as may be shattered and expelled by an explosion in the chamber and so positioned also to prevent light from entering the chamber directly through the aperture, and a mirror so disposed in the casing that the terminals of the spark plug can be viewed by reflection through said aperture and said transparent wall, the mirror being positioned relatively to the aperture so that said fragments will not be deflected out through said aperture, the space between said transparent wall and the mirror being in communication with said opening.

5. In a spark plug tester, the combination of a casing having an observation aperture and a separate pressure relief opening, a pressure chamber in the casing having a port in one of its walls for the insertion of the terminal end of a spark plug and having a transparent wall, and a mirror in the casing so positioned that the reflection of the spark plug in the mirror can be viewed through the observation aperture, the aperture and transparent wall being relatively positioned to exclude all light from shining directly through the aperture into the chamber and so that the space between the aperture and said transparent wall is in wide open communication with said opening.

6. A spark plug tester comprising the combination of a casing provided with a pressure relief opening and having an observation aperture in its upper surface, a wall extending upwardly at one side of the aperture for cutting off light rays coming toward the aperture from that side, a mirror within the casing, a pressure chamber behind said wall and having a bottom transparent wall through which the interior of the chamber may be viewed through said aperture by its reflection in the mirror, the aperture being positioned relatively to the transparent wall to prevent light rays from shining through the aperture into the chamber and to prevent fragments of said transparent wall when shattered by a chamber explosion from flying out through the aperture, the space between said aperture and transparent wall being in wide open communication with said opening.

7. In a spark plug tester, the combination of a casing, a pressure chamber in the casing having an opening for the insertion of the terminal end of a spark plug, the chamber having a transparent wall portion, the casing having an observation aperture, and a mirror within the casing positioned relatively to said aperture and said transparent portion so that the terminals of a spark plug mounted in said opening can be viewed from outside by observing their reflection in the mirror, said aperture being so disposed that fragments of the transparent wall portion cannot be forced by a chamber explosion through said aperture directly or deflected through the aperture by the mirror.

8. A spark plug tester comprising the combination of a casing having an observation aperture in a portion of its upper surface, a compression chamber in the casing rising above and at one side of the aperture in position to cut off rays of light coming from said side toward the aperture, a transparent bottom wall in the chamber, a mirror in the casing positioned so that the interior of the chamber can be viewed through the aperture by reflection in the mirror, the aperture being positioned relatively to the transparent wall of the chamber to prevent light from shining directly through the aperture into the chamber and so that explosions from the chamber will not be directed toward the aperture, means for holding a spark plug with its terminals in the chamber opposite the transparent wall, and means for regulatably admitting air to the chamber.

9. A spark plug tester comprising the combination of a casing having an observation aperture in a portion of its upper surface, a compression chamber in the casing rising above the aperture with one of its walls extending upwardly from an edge of the aperture in position to cut off rays of light coming from that side toward the aperture, a transparent bottom wall in the chamber, a mirror in the casing positioned so that the interior of the chamber can be viewed through the aperture by reflection in the mirror, the aperture being positioned relatively to the transparent wall of the chamber to prevent light from shining directly through the aperture into the chamber and so that explosions from the chamber will not be directed toward the aperture, means for holding a spark plug with its terminals in the chamber opposite the transparent wall, and means for regulatably admitting air to the chamber.

10. A spark plug tester comprising the combination of a casing having an observation aperture in a portion of its upper surface, a compression chamber in the casing rising above and from one edge of the aperture in position to cut off rays of light coming from that side toward the aperture, a transparent closure for said aperture mounted therein at a substantial angle to the horizontal, a transparent bottom wall in the chamber, a mirror in the casing positioned so that the interior of the chamber can be viewed through the aperture by reflection in the mirror, the aperture being positioned relatively to the transparent wall of the chamber to prevent light from shining directly through the aperture into the chamber and so that explosions from the chamber will not be directed toward the aperture, means for holding a spark plug with its terminals in the chamber opposite the transparent wall, and means for regulatably admitting air to the chamber.

In witness of the foregoing I affix my signature.

CHAS. W. PRICE.